US008266398B2

(12) United States Patent
Manczak et al.

(10) Patent No.: US 8,266,398 B2
(45) Date of Patent: Sep. 11, 2012

(54) METHOD AND APPARATUS FOR PRESERVING MEMORY CONTENTS DURING A POWER OUTAGE

(75) Inventors: Olaf W. Manczak, Hayward, CA (US); Michael H. Paleczny, San Jose, CA (US); Eric J. Kustarz, San Francisco, CA (US)

(73) Assignee: Oracle America, Inc., Redwood Shores, CA (US)

( * ) Notice: Subject to any disclaimer, the term of this patent is extended or adjusted under 35 U.S.C. 154(b) by 486 days.

(21) Appl. No.: 12/125,712

(22) Filed: May 22, 2008

(65) Prior Publication Data

US 2009/0292887 A1 Nov. 26, 2009

(51) Int. Cl.
G06F 13/00 (2006.01)
G06F 13/28 (2006.01)
(52) U.S. Cl. .. 711/162; 711/103; 711/165; 711/E12.103
(58) Field of Classification Search .................. None
See application file for complete search history.

(56) References Cited

U.S. PATENT DOCUMENTS

| 6,707,748 | B2* | 3/2004 | Lin et al. ........................ 365/228 |
| 2005/0117418 | A1* | 6/2005 | Jewell et al. .................. 365/202 |
| 2006/0242458 | A1* | 10/2006 | Feldman et al. ................ 714/14 |
| 2008/0028244 | A1* | 1/2008 | Capps et al. .................. 713/324 |
| 2009/0089481 | A1* | 4/2009 | Kapoor et al. ................ 711/103 |

* cited by examiner

Primary Examiner — Kevin Verbrugge
Assistant Examiner — Eric S Cardwell
(74) Attorney, Agent, or Firm — Park, Vaughan, Fleming & Dowler LLP (57) ABSTRACT

A method and apparatus for preserving contents of a volatile memory when a main (e.g., AC) power source is disconnected. The apparatus comprises flash memory, a controller for writing to the flash memory and a temporary power source. The temporary power source may be a relatively low power battery or supercapacitor. The apparatus is removably attached to a computing device (e.g., via a USB port). When main power of the device is disconnected, the temporary power source provides power for the apparatus, the volatile memory containing data to be safeguarded, and sufficient processing resources to transfer the data. For example, an auxiliary processor may be powered (instead of a relatively high-power processor) or just one core of a multi-core processor. Data are written to the apparatus and can be recovered when main power is reconnected. Or, the apparatus may be detached and attached to a different device for data recovery.

21 Claims, 4 Drawing Sheets

METHOD AND APPARATUS FOR PRESERVING MEMORY CONTENTS DURING A POWER OUTAGE

BACKGROUND

This invention relates to the field of computer systems. More particularly, a method and apparatus are provided for preserving the contents of volatile memory in the event of a power outage.

Virtually every computing device possesses some form of volatile memory, such as RAM (Random Access Memory). Contents of volatile memory are lost when the memory's power source is turned off or interrupted, which distinguishes it from non-volatile memory (e.g., disk) that retains its contents even without continuous power. Volatile memory is generally much faster than non-volatile memory and is therefore more suitable for use as a processor's main or primary memory.

In some data processing systems—especially transactional systems that manipulate databases or file systems—processing must occasionally be halted while operational data in main memory is committed to secondary, non-volatile storage such as a disk or disk array. However, even a short pause in processing can have a significant effect on the application's throughput.

More specifically, because of the mechanical nature of a disk drive, on average half a rotation of the disk must occur before the data can be stored. For a typical disk drive this may amount to approximately 4 ms. That 4 ms may translate, in a modern processor, to more than 10 million cycles of processing time lost or wasted. If the processor blocks on a regular basis to commit memory contents to secondary storage, the effective performance of the computer system can be noticeably degraded.

Attempts to overcome this problem of performance degradation while ensuring the commitment of important data to non-volatile memory generally involve the use of NVRAM (Non-Volatile Random Access Memory). NVRAM solutions usually pair specialized volatile memory (e.g., DRAM or Dynamic RAM) with a high-capacity battery for powering the memory in case main power is lost. The transactional data is written to NVRAM memory (instead of directly to secondary storage), and then from NVRAM to secondary storage. If main power is lost, as long as the battery retains a charge the NVRAM should retain the data.

Another type of NVRAM solution requires the battery to power not only the volatile memory, but also the secondary storage to which the memory's contents are written. The battery powers both components to allow the memory to be flushed to storage.

However, these types of solution can be very expensive and therefore unsuitable for use in low-end computer systems that must have relatively low costs. One reason for the high cost associated with NVRAM is the specialized battery. In the latter type of NVRAM solution, the battery must be designed to provide a large amount of power (e.g., disk drives may require 20-30 watts each for a period of several minutes). In the former type of solution, the battery must retain its charge for a significant period of time (e.g., weeks) in case of an extended downtime. In addition, the engineering involved in supplying power from a battery with little or no risk of fire adds to the cost.

Another reason NVRAM solutions are expensive is that they often use special low-power memory. Conventional forms of volatile memory, such as DIMMs (Dual Inline Memory Module), would exhaust the battery power in a shorter period of time.

In modern computer systems, it is common to combine NVRAM with a storage subsystem (e.g., a storage array). For example, an NVRAM component may be situated within a storage array that is separated from the processor by a network (e.g., an SAN or Storage Array Network), rather than being located within the computer system that relies on the NVRAM to preserve transaction data. Such a combination provides an abstraction of a large capacity storage system that is not subject to the delay associated with disk rotation.

But, a different problem arises when an NVRAM component is located remote from the processor that generates the transaction data to be stored. In particular, in the event of a power failure in the network, it is possible that the transaction data will have been written to non-volatile storage without delivery of an acknowledgement to the main computer, thereby rendering transaction status inconsistent or ambiguous. From the point of view of the non-volatile storage the transaction will be committed, but to the computer memory the transaction will seem uncommitted. If the power failure subsequently affects the main computer, the inconsistency may become permanent.

On the other hand, if the NVRAM component is situated proximate to the processor, such as on the same motherboard, then it may become very difficult or even impossible to retrieve the data it retains in the event of a major system failure. In particular, if the processor (or other primary component of the motherboard) fails, data from a transaction that is deemed completed may remain in the NVRAM without having been written to secondary storage. If the entire motherboard must be replaced, the NVRAM data may become irretrievable or, if the battery back-up power is disconnected, may dissipate.

SUMMARY

In one embodiment of the invention, a method and apparatus are provided for preserving contents of volatile memory in the event of a power failure, while using relatively low-cost commodity components.

In some embodiments of the invention, the apparatus comprises flash memory, a controller for the flash memory, and an alternative static power source (e.g., a battery, a supercapacitor). The apparatus may be configured as one or more pluggable components, in which case they are removably connectable to a computing device via a USB (Universal Serial Bus) port or other port.

When main power (e.g., AC power) of the computing device is disconnected or interrupted, the alternative power source is immediately applied to power the flash memory controller (and the flash memory if necessary), the device's main memory and sufficient processing resources to copy data from the main memory to the flash memory. Illustratively, only one core of a multi-core CPU need be powered, or an auxiliary processor (e.g., a specialized low-power processor) may be used. As another alternative, the apparatus may comprise a low-cost processor for facilitating the data transfer.

In one implementation, the apparatus may be installed internal or external to the computing device, but within relative proximity to the computing device's processor and main memory. In another implementation the apparatus may be installed in proximity to a storage device or array, which may be remote from a computing device's processor.

Because the flash memory is non-volatile, once the data are written to the flash memory, they can be easily recovered when power is reconnected and the device resumes normal operation. In embodiments of the invention in which the apparatus is configured for removable attachment, it may be relocated to a different computing device for data recovery.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In one embodiment of the invention, a method and apparatus are provided for preserving the contents of volatile memory when primary power is lost or interrupted, without requiring a specialized NVRAM (Non-Volatile RAM) solution or other specialized components. As described previously, some NVRAM solutions are quite expensive, such as those that involve a custom motherboard, a high-capacity battery and/or low-power memory. Instead, readily available commercial off-the-shelf components may be employed in embodiments of the invention, which can help keep the cost of the apparatus low.

In embodiments of the invention described herein, a form of flash memory is employed to safeguard data after main power fails or is disconnected. Because flash memory is non-volatile, it does not need a back-up power source to preserve its data after the data are stored, although a battery or similar device (e.g., a supercapacitor) is employed to allow active data to be flushed to the flash memory. This power source can be of relatively small capacity (e.g., a type of battery used in a digital camera or time piece).

During normal operation of a computer or other device in which an embodiment of the invention is implemented (e.g., a PDA, a telephone), active data need not be written to the flash memory. Instead, the device operates normally to flush data from main memory to secondary storage as needed. Upon loss of main power, the flash memory captures data that has been committed to the device's memory but that has not yet been committed to secondary storage.

In particular, when the apparatus is activated (e.g., when the device's main power is lost or cut off), its power source is engaged to power the flash memory (or a controller for the flash memory), the device's memory that is to be flushed (e.g., main memory, a memory module dedicated to a particular application), and some processing element capable of writing to the flash memory from the device's memory. For example, in a multi-core computer system, one core may be powered to perform the data transfer while the others are shut down.

As another alternative, the apparatus may comprise a relatively low-power or limited functionality processor for facilitating the data transfer. This processor may be provided with executable instructions specific to the computing device, the device's operating system, the application(s) for which data are to be saved, or even a generic set of instructions for operation.

Advantageously, in a computer system or computing device equipped with an embodiment of the invention, write requests to the device's operating system (e.g., from applications and utilities) can be acknowledged automatically. Specifically, because the data will be preserved even if power is lost, an acknowledgement can be issued before the data are actually written to non-volatile memory.

In different embodiments of the invention, different types and forms of flash memory may be used, including NAND- or NOR-based, serial or parallel, single-level or multi-level, with or without an embedded controller, etc. Illustratively, the flash memory may incorporate any of a variety of commercially available solutions, such as CompactFlash (CompactFlash Association), Memory Stick (Sony), MultiMediaCard (MMC Association), Secure Digital Card (SD Card Association), SmartMedia Card (Toshiba), and all others now known or hereafter developed. The apparatus may be packaged similar to a USB (Universal Serial Bus) drive or other component configured for external attachment to a computing device, or may be installed internally on a temporary or (semi-) permanent basis.

In some embodiments of the invention, the apparatus may be configured with two (or more) flash memories in the interest of redundancy, error detection and error correction, in which case data may be written to the multiple flash memories in parallel. Also in some embodiments of the invention, the computing device's memory from which data are to be transferred, and/or the processing resource(s) used to transfer the data, may be down-clocked to reduce their power consumption.

Figure 1:
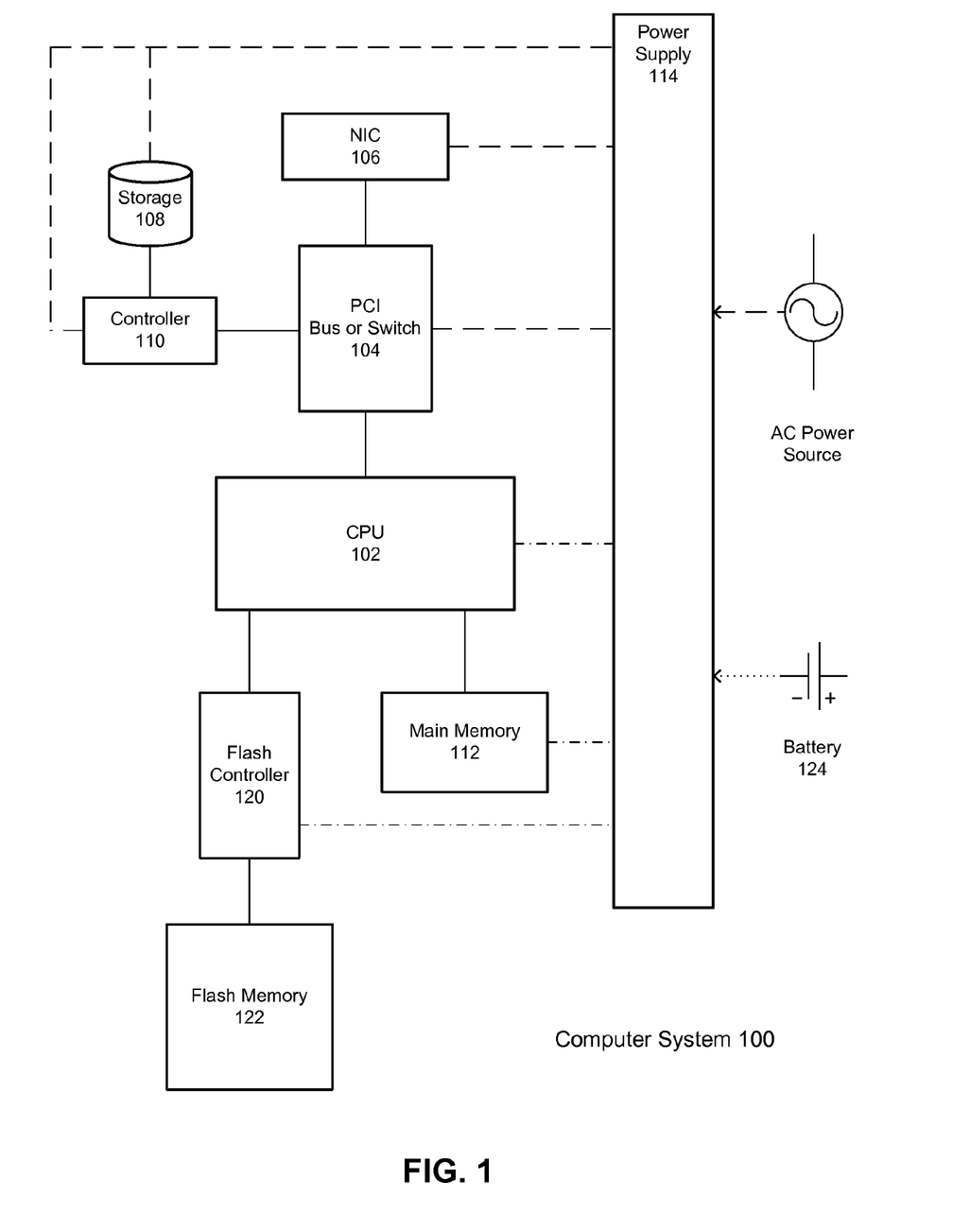
FIG. 1 is a block diagram depicting a computer system employing an apparatus for retaining memory contents during a power outage, in accordance with an embodiment of the present invention.

FIG. 1 is a block diagram illustrating a computer system configured to use an apparatus for preserving memory contents during a power outage, according to one embodiment of the invention.

In FIG. 1, computer system 100 includes CPU 102, PCI-E switch 104, NIC (Network Interface Circuit) 106, controller 110 and one or more disk drives (or other secondary storage) 108, main memory (e.g., RAM) 112 and power supply 114. Disk drives 108 connected to controller 110 may be located local to system 100 (as in FIG. 1) or remote from system 100 (e.g., in a Storage Array Network). The computer further includes flash controller 120, flash memory 122 and battery 124, which are removably coupled to the computer system via a USB port or other port. In an alternative embodiment of the invention, battery 124 may be a supercapacitor.

In a normal mode of operation, CPU 102 of computer system 100 processes data for any number of applications, and the components of the system that require power are powered by power supply 114, which draws upon an AC source. Power supply 114 is also supplied by battery 124, but when power is drawn from battery 124 only select elements of computer system 100 are powered. The different patterns of lines connecting the AC power source and battery 124 to power supply 114 indicate which components may be powered by which sources.

Thus, PCI bus/switch 104, NIC 106, storage 108 and controller 110 are powered by AC power, while CPU 102, main memory 112 and flash controller 120 are powered by both AC and DC power.

In particular, when the AC source fails, power is shut off to components other than CPU 102, memory 112 and flash controller 120, which will now be powered by battery 124. Computer system 100 enters a transition mode of operation configured to ensure that necessary data in memory 112 are saved to flash memory 122. In this embodiment of the invention, flash controller 120 is collocated with flash memory 122 (e.g., in a removable device); therefore, no separate power need be supplied to the flash memory. In other embodiments of the invention, however, power from battery 124 may be supplied to flash memory 122 if needed.

In one implementation, battery 124 (or a supercapacitor used in place of a battery) supplies between 375 J and 9000 J (joules) of energy, assuming that computer system 100 is a 1U (one rack unit) server. This allows the battery to supply between 15 W and 90 W of power, for a period of 25 to 100 seconds, to the CPU, main memory and flash controller. Depending on the type of CPU, the amount of memory and the speed of data transfer from the memory, in other implementations a battery (or supercapacitor) providing more energy may be required.

In the embodiment of the invention depicted in FIG. 1, CPU 102 is a multi-core CPU, and in the transition mode all but one core is shut down. The remaining core dedicates itself to copying data from memory 112 to flash memory 122. In different implementations, the active core may simply dump the memory contents to flash, may selectively save memory contents (e.g., based on which application they belong to or where in memory they are stored), or may even execute a part of an application configured to facilitate copying of the application's data.

In other embodiments of the invention, different processor resources may be engaged to perform the transfer. Thus, the computer system's primary CPU may continue to operate in full, but for the primary purpose of transferring data, or an auxiliary processor may be activated and the primary processor may be powered off.

The operating system executed on computer system 100, and/or applications, applets, utilities and other software that execute on the system, may be modified to be compatible with the transition mode of operation. In particular, application software may need to be modified to recover from a power outage by checking flash memory 122 for data to commit to secondary storage before resuming regular processing. In addition, the computer system will be configured to recharge battery 124 as needed to keep it ready for a main power outage.

Figure 2:
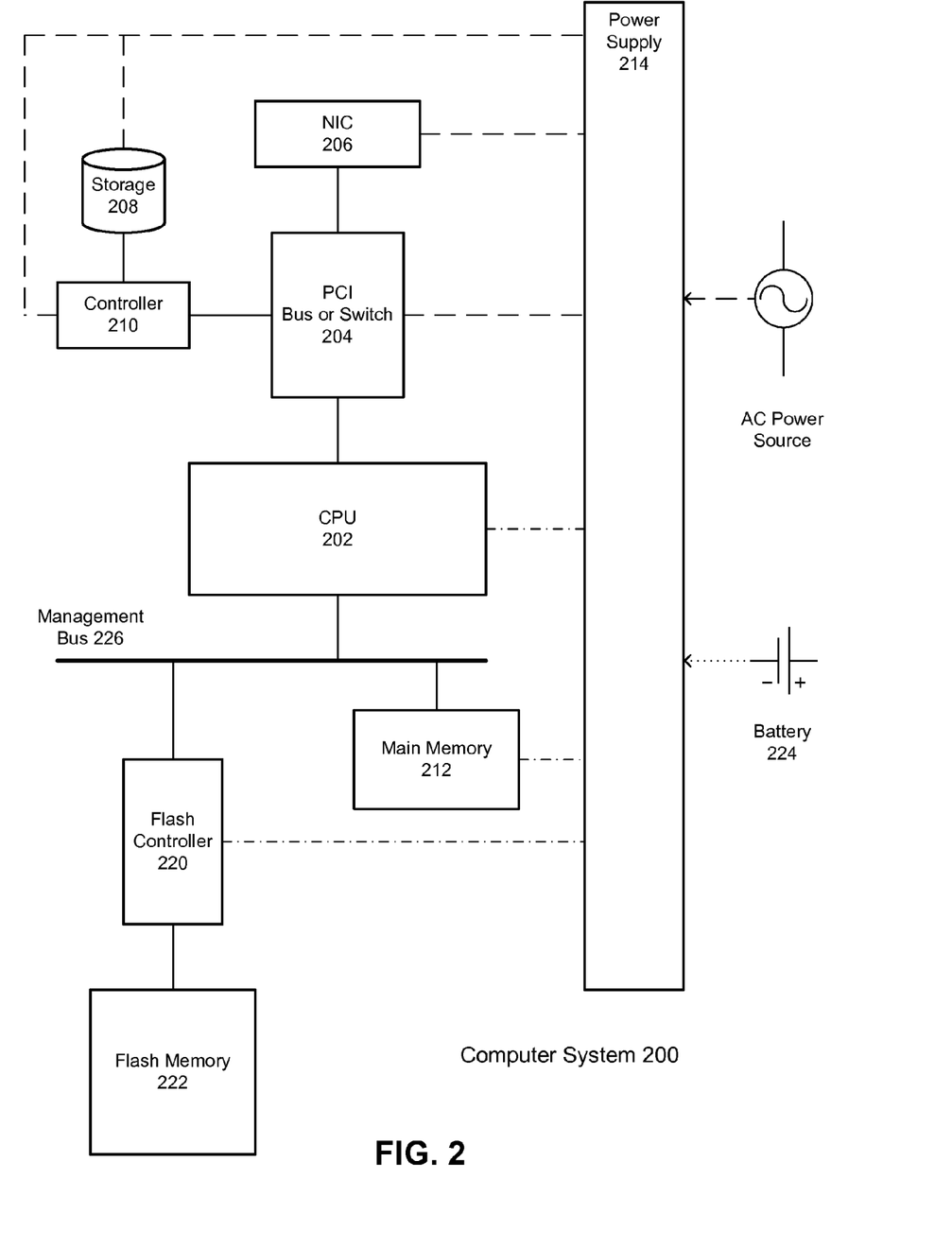
FIG. 2 is a block diagram depicting a computer system employing an apparatus for retaining memory contents during a power outage, in accordance with an embodiment of the present invention.

FIG. 2 is a block diagram illustrating another computer system configured to use an apparatus for preserving memory contents during a power outage, according to another embodiment of the invention.

In FIG. 2, computer system 200 includes CPU 202, PCI switch or bus 204, NIC (Network Interface Circuit) 206, controller 210, one or more disk drives or other storage 208, main memory (e.g., RAM) 212 and power supply 214. The computer further includes flash controller 220, flash memory 222, battery 224 and management bus 226. In one alternative implementation, flash controller 220 may be coupled to CPU 202 via PCI bus/switch 204.

In this embodiment, the computer system uses a bus architecture instead of a switch architecture for connecting some peripheral components. As with storage 108 of computer system 100, disk drives or other storage devices 208 may be located local to or remote from other components of computer system 200.

As with the embodiment of FIG. 1, when the AC power source of computer system 200 fails or is disconnected, battery 224 is used to power flash controller 220, main memory 212, whatever resources of CPU 202 are configured to transfer data to flash memory 222 (e.g., a particular core, an auxiliary processor) and, if necessary, management bus 226.

In one alternative embodiment of the invention, an apparatus described herein is installed within a disk array or other storage component of a computer system. The apparatus may comprise flash memory, a flash controller for the flash memory, and a power source (e.g., a battery or supercapacitor).

In a normal mode of operation in this embodiment, the storage component's controller functions normally to exchange data between the storage resources and an external processor, switch, network or other element. When main power for the storage component is lost, the apparatus' battery powers the controller (and any associated internal or external memory) and data that have not yet been committed to the storage resources are written to the flash memory. In one implementation of this embodiment of the invention, the storage component controller may also serve as the controller for the flash memory.

In the embodiments of the invention depicted in FIGS. 1-2, the battery or supercapacitor is automatically recharged during normal operation of the computer system. In one implementation, normal mode operation within the computer system may not resume, after main power is again available, until the battery possesses a minimum level of charge.

Further, application software, an operating system, firmware and/or other computer-executable code residing on the computer system is configured to be compatible with the apparatus. For example, any application for which data may be copied to flash memory because the system enters a transition mode after failure of main power may be designed or modified to check the flash memory (and recover any corresponding data) when normal mode operation resumes.

Figure 3:
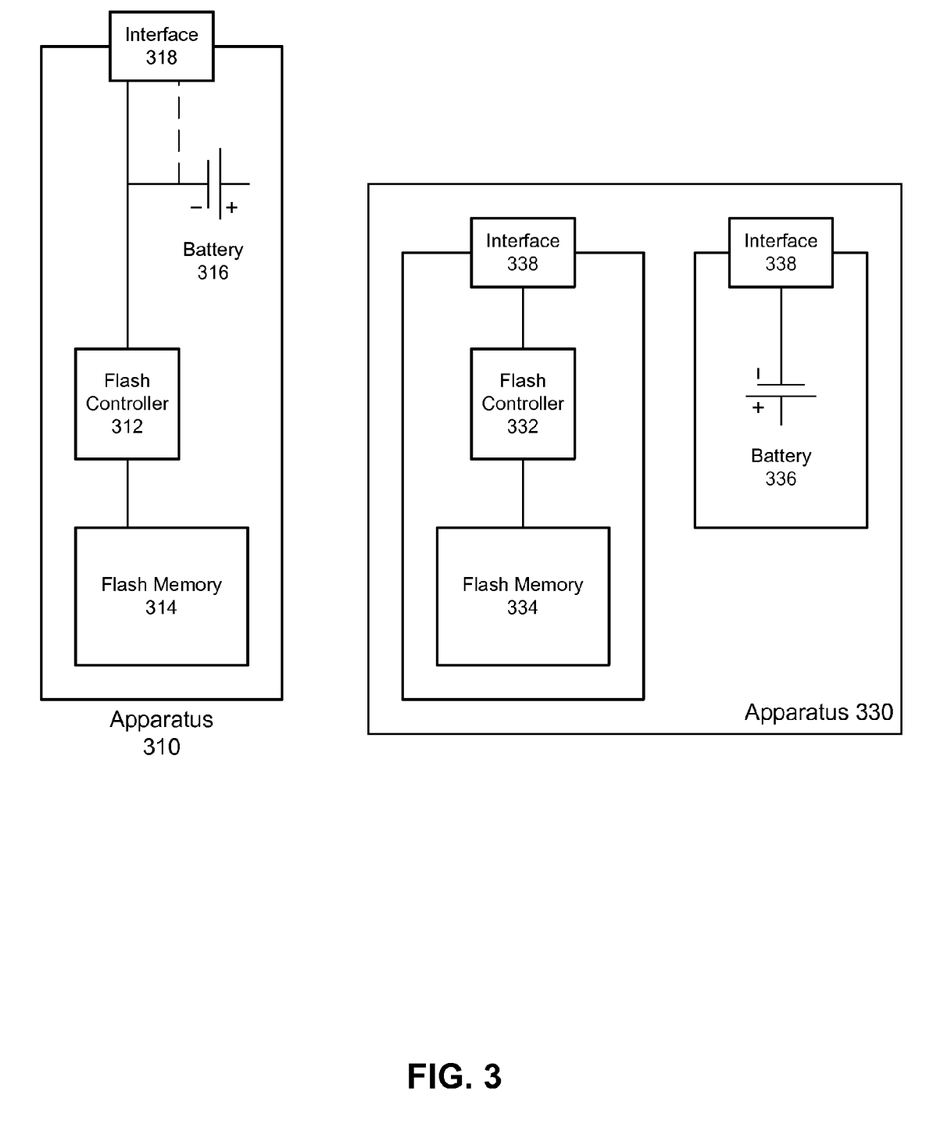
FIG. 3 is a block diagram depicting an apparatus for retaining memory contents during a power outage, in accordance with an embodiment of the present invention.

FIG. 3 is a block diagram of illustrative forms of an apparatus for preserving data in the event of a power outage, according to one embodiment of the invention.

Apparatus 310 incorporates all three elements—flash controller 312, flash memory 314 and battery 316—into a single component or entity. This component may be configured for removable insertion in a computing device, and therefore interface 318 may be a USB (Universal Serial Bus), FireWire (IEEE 1394) or other interface. Apparatus 310 is easily portable and may be the size of a USB drive.

In an embodiment of the invention, two or more instances of apparatus 310 may be simultaneously attached to a computing device. In this embodiment, data copied from the device's memory after a main power failure may be written to all the attached apparatuses in parallel.

Apparatus 330 employs two discrete components, one containing flash controller 332 and flash memory 334, and the other containing battery 336. Both components may be configured with the same interface (interface 338) for the host device or, alternatively, may employ different interfaces. In this embodiment, the components may be inserted into or removed from the host device separately.

In an embodiment of the invention, an apparatus described herein (e.g., apparatus 310, apparatus 330) may include multiple flash memories, to provide redundancy and protection against errors that may otherwise arise during preservation of a device's data.

In different embodiments of the invention, an apparatus for preserving memory contents after a power loss may be installed with varying degrees of permanence. For example, apparatuses 310 or 330 may be plugged into an external interface of a computer system, thereby making them easily removable (e.g., for use in a different computer). Alternatively, an apparatus may be installed internal to a computer system, thereby making it less easily removable or replaceable. In particular, the interface of an apparatus may be configured for mating with a motherboard, daughterboard, storage controller or other component not externally accessible.

Figure 4:
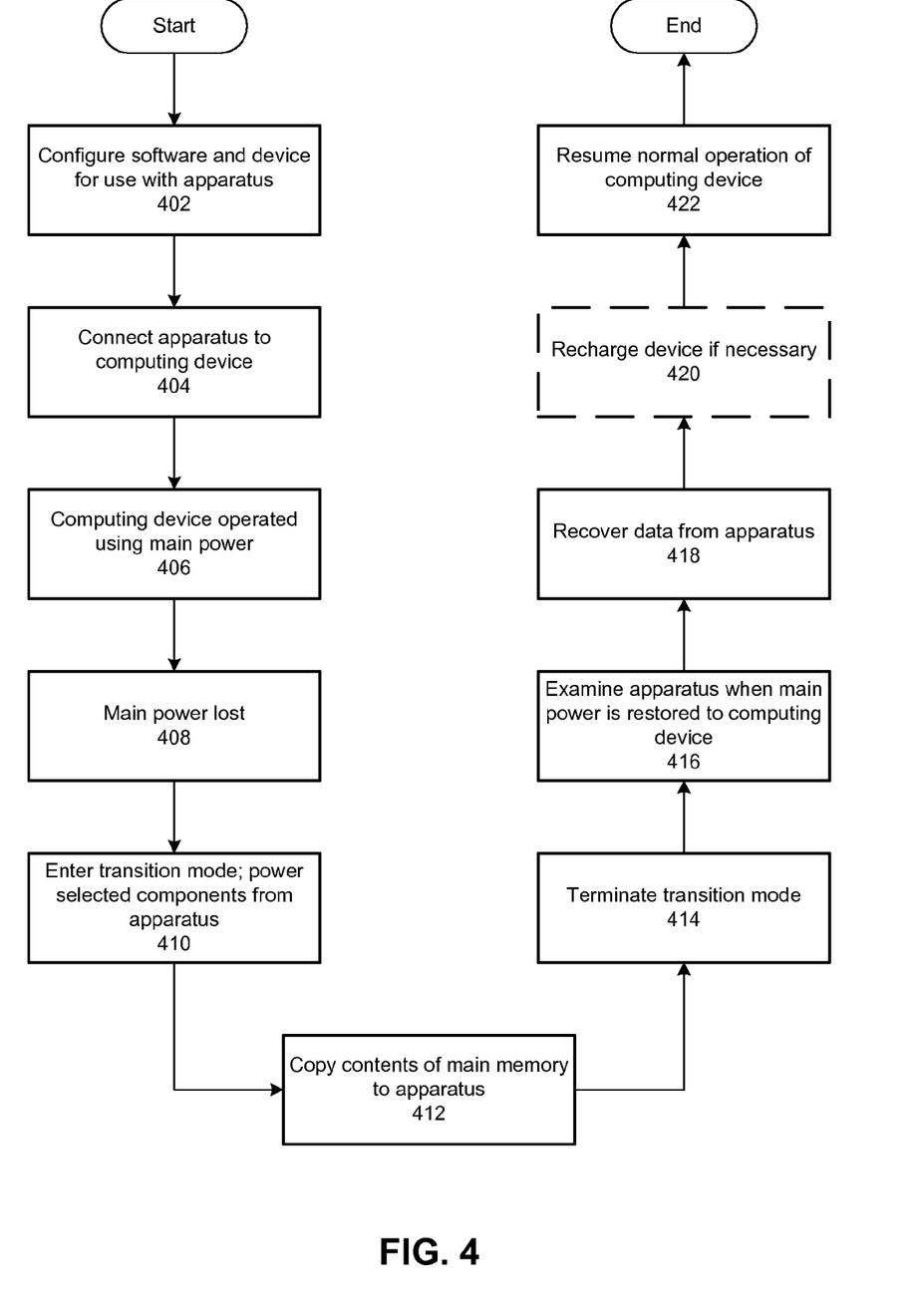
FIG. 4 is a flowchart illustrating one method of retaining memory contents during a power outage, in accordance with an embodiment of the invention.

FIG. 4 is a flowchart demonstrating a method of employing an apparatus described herein to save contents of a computing device's memory in the event of a power outage, according to one embodiment of the invention.

In operation 402, the computing device and any application or operating system whose data may be saved to the apparatus are configured as needed. For example, one or more USB ports, IEEE 1394 ports or other ports of the device may be made available, the software may be updated, upgraded or replaced with a version that can recover data saved to the apparatus, and so on.

In particular, the computing device's operating system or other system software may be configured to operate more efficiently with the apparatus. For example, if the software is patched or configured to be compatible with the apparatus, it may divide or mark memory according to whether or not the contents are to be saved on the apparatus in the event of a power failure. This will save time in the event the power does fail.

The computing device may already be configured to operate from an AC power source and/or a battery or other source of the type employed in the apparatus, or may need to be modified to be compatible. For example, laptop computers are generally already capable of operating from a main AC source or, when the AC source is unavailable, from a battery.

In operation 404, the apparatus is connected to the computing device. This may involve simply plugging it into an external port of the device, or may require opening the device to install it internally.

In operation 406, the computing device is operated in a normal mode or manner, while powered by a main (e.g., AC) power source other than the alternative temporary power source included with the apparatus. In this mode of operation, one or more programs execute to process data for which a high degree of integrity is desired.

For example, a transactional application may be configured to write important data from the device's main memory to secondary storage (e.g., disk). The application may block while waiting for a write to complete, or a transaction may not be considered complete or committed until the write is successful. In this case the apparatus may be configured to recognize the application's data or to ensure it includes the application's data when it is activated.

In operation 408, the main power source fails, is disconnected or otherwise becomes unavailable.

In operation 410, a transition mode of operation commences immediately upon failure of the main power. In this mode of operation, the alternative power source provided with the apparatus (e.g., a battery, a supercapacitor) is relied upon to power the apparatus, the computing device's memory in which the sensitive data is stored, and sufficient processing resources to copy the data from the memory to the apparatus.

In operation 412, the processing resources (e.g., the computing device's CPU, one of multiple cores, a low-power processor) copies some or all data from the device's main memory to the apparatus. Illustratively, all memory contents may be dumped or copied, just those contents in a given range of memory addresses, just data associated with one or more particular programs, etc.

In one implementation, some record of activation of the transition mode is stored on the apparatus. For example, a special file or entry may be stored, to be detected when main power is restored and the computing device reboots and examines the apparatus. This record will allow the device (and, any affected applications) to recognize that the transition mode was activated and that a data recovery effort may need to be initiated. The record may include a timestamp, may indicate whether and/or how much data was saved, which application(s) need to recover saved data, etc.

In operation 414, the transition mode terminates after all desired data has been copied. In one implementation, state data regarding the computing device's operating system and any number of applications may also be saved to the apparatus, to allow faster resumption of the device's normal operating mode when main power is reconnected.

In operation 416, when main power is reconnected, the operating system and/or any applications for which data was saved to the apparatus check the apparatus to determine if it contains data saved during a recent transition mode. Illustratively, the apparatus may be examined every time the device boots, to determine if it contains data more recent than the last normal shutdown of the device. Note that when main power is reconnected, the apparatus automatically begins recharging (if not fully charged).

Also in operation 416, the device may examine a power level of the apparatus' alternative power source. Illustratively, the device may be automatically recharged while main power is applied, but if the alternative power source is not fully charged or is not charged beyond some threshold level (e.g., a level considered sufficient to allow memory contents to be saved in the event of (another) power failure), the device may postpone resumption of normal operations until the alternative power source is recharged. Alternatively, the device (e.g., the device's operating system) may generate a warning to a user that the apparatus is not fully charged, thereby allowing the user to determine whether to proceed with normal operations.

In operation 418, data saved to the apparatus is recovered. In this embodiment of the invention, each application for which data was saved to the apparatus is opened and executed to process the saved data—which may include writing it to secondary storage. Illustratively, this may occur before normal operation of the device proceeds, or may amount to an initial part of the resumption of normal operations.

In optional operation 420, the apparatus' alternative power source may be recharged before the normal mode of operation resumes and before data can be written again.

After the saved data are recovered, the data may be erased from the apparatus, their data locations may be invalidated, or other action may be taken to ensure the data are not re-processed in the future (e.g., if the main power fails again).

In operation 422, normal operation of the computing device resumes.

In one alternative embodiment of the invention, the removable nature of the apparatus allows stored data to be recovered on a device other than the device from which the stored data was copied. For example, after the transition mode is terminated in operation 414, the apparatus may be removed and attached to a second computing device.

The second computing device may be configured to automatically check the apparatus for saved data, may be rebooted (during which the saved data is automatically detected), or software for interacting with the apparatus may be executed to access the data. Thus, in this alternative embodiment of the invention, the saved data are recoverable even in the event of a catastrophic failure within the original computing device (e.g., a failure on the motherboard, a complete power supply failure).

The environment in which a present embodiment of the invention is executed may incorporate a general-purpose computer or a special purpose device such as a hand-held computer. Details of such devices (e.g., processor, memory, data storage, display) may be omitted from preceding descriptions for the sake of clarity.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules may include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. A computing device configured to copy data from volatile memory to non-volatile memory during a power outage, the computing device comprising:
a multi-core processor configured to execute program code;
volatile memory configured to temporarily store data during use by the processor while executing the program code;
non-volatile flash memory; and
a temporary power source configured to power the processor, the volatile memory and the flash memory when a primary power source is unavailable;
wherein, if the primary power source is available, the computing device is configured to store the data to the volatile memory without writing the data to the flash memory and to receive one or more indications from an application executing on the multi-core processor, each indication indicating one or more memory ranges for the application in the volatile memory and indicating that data in the one or more memory ranges is to be saved to the flash memory if the primary power source is unavailable, and
otherwise, if the primary power source is unavailable, the computing device is configured to copy data for the application from the volatile memory to the flash memory by copying memory ranges for the application in the volatile memory for which an indication was received.

2. The computing device of claim 1, further comprising a controller configured to write data to the flash memory.

3. The computing device of claim 2, wherein the flash memory, the temporary power source and the controller are removably coupled to the computing device, such that they can be removed during operation of the computing device without degrading the performance of the computing device.

4. The computing device of claim 1, wherein the flash memory and the temporary power source are portable.

5. The computing device of claim 1, wherein the flash memory and the temporary power source are configured for removable coupling with the computing device.

6. The method of claim 1, wherein, if the primary power source is unavailable, the computing device is configured to copy data for the application by executing a part of the application configured to facilitate copying of the data.

7. A removable apparatus for saving data from a computing device's volatile memory when power supplied to the computing device by a main power source is interrupted, the apparatus comprising:
flash memory configured to store the data in a non-volatile manner, wherein the data is transferred to the flash memory only upon the main power source being interrupted; and
a commercially available alternative power source configured to power a portion of the computing device after the main power interruption,
wherein, if the main power source is interrupted, the computing device is configured to copy data for an application executing on the computing device from the volatile memory to the flash memory by copying memory ranges for the application in the volatile memory that the application indicated are to be saved to the flash memory if the main power source is interrupted.

8. The apparatus of claim 7, further comprising:
a controller for the flash memory, wherein the controller is powered by the alternative power source after the main power source is interrupted.

9. The apparatus of claim 7, further comprising:
a USB (Universal Serial Bus) interface for removably coupling the apparatus to the computing device.

10. The apparatus of claim 7, wherein the portion of the computing device powered by the alternative power source after the main power interruption comprises:
the volatile memory; and
a processor resource configurable to copy data from the volatile memory to the flash memory.

11. The apparatus of claim 7, wherein the alternative power source comprises a relatively low capacity battery.

12. The apparatus of claim 7, wherein the alternative power source comprises a supercapacitor.

13. A method of protecting data during loss of a computing device's main power, the method comprising:
receiving a removable connection to the computing device of an apparatus comprising flash memory and an alternative power source;

operating the computing device in a normal mode, in which data are temporarily stored in a volatile memory of the computing device for transfer to secondary storage, wherein during the normal mode, the data is not stored to the flash memory, and wherein, during the normal mode, the computing device receives one or more indications from an application executing on the computing device, each indication indicating one or more memory ranges for the application in the volatile memory and indicating that data in the one or more memory ranges is to be saved to the flash memory responsive to failure of the main power;

detecting failure of the main power;

upon detection of the main power failure, operating the computing device in a transition mode of operation, said transition mode characterized by:
  powering a selected subset of components of the computing device from the alternative power source; and
  using the selected subset of components to copy data for the application from the volatile memory of the computing device to the flash memory by copying memory ranges for the application in the volatile memory that the application indicated are to be saved to the flash memory responsive to failure of the main power source.

14. The method of claim 13, further comprising, after said copying, resuming the normal mode of operation when the main power is restored.

15. The method of claim 14, wherein said resuming comprises:
  examining the flash memory to determine if it contains data saved during the transition mode; and
  recovering the data copied to the flash memory.

16. The method of claim 14, wherein said resuming comprises:
  determining whether the alternative power source contains a threshold level of power; and
  if the alternative power source does not contain the threshold level of power, postponing resumption of the normal mode of operation until the alternative power source contains the threshold level of power.

17. The method of claim 13, further comprising:
  removing the apparatus from the computing device;
  connecting the apparatus to another computing device; and
  recovering on the other computing device the data copied to the apparatus.

18. The method of claim 13, wherein the apparatus further comprises a controller for the flash memory.

19. The method of claim 13, wherein the selected subset of components comprises:
  the volatile memory; and
  a processor resource configurable to write to the flash memory.

20. The method of claim 13, wherein, prior to receiving the removable connection, the computing device acknowledges write requests to non-volatile storage after data for the write requests is written to the non-volatile storage, and
  wherein, after receiving the removable connection, the computing device automatically acknowledges write requests to non-volatile storage before data for the write requests is written to the non-volatile storage.

21. The method of claim 13, wherein the computing device stores a record of activation of the transition mode on the apparatus.

* * * * *